United States Patent Office 2,877,006
Patented Mar. 10, 1959

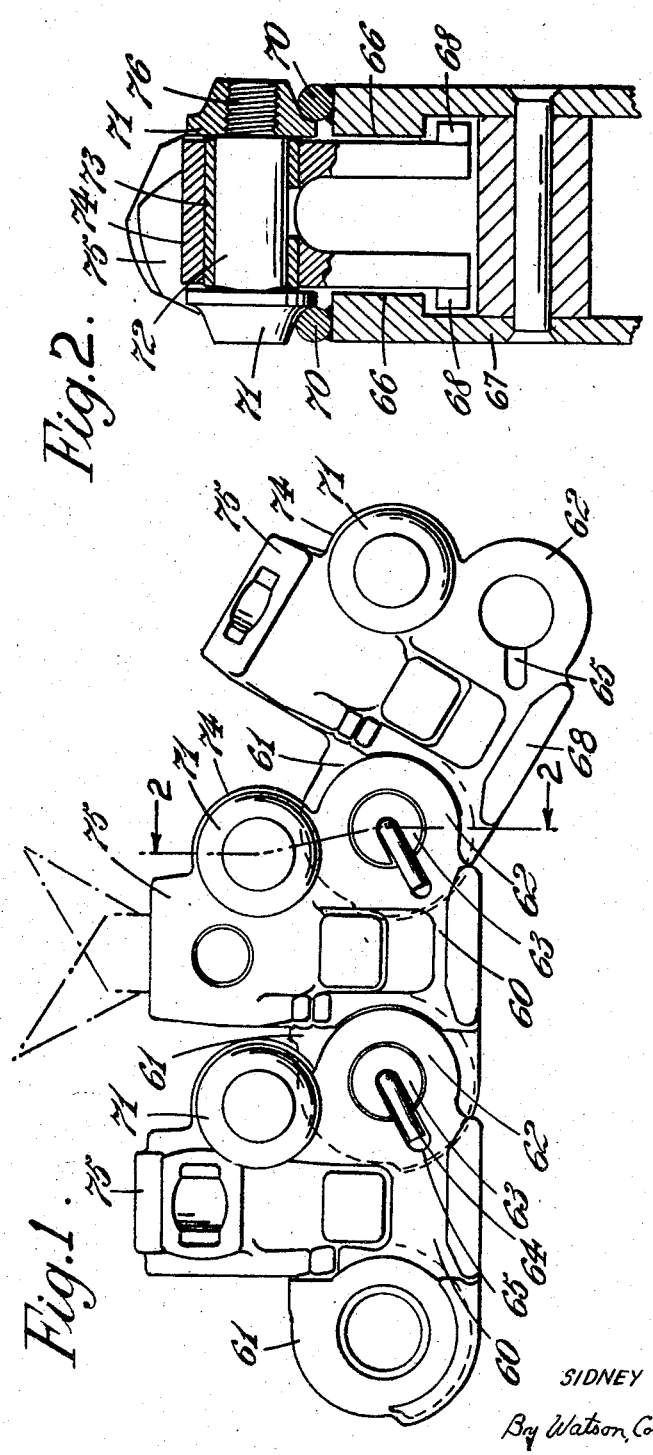

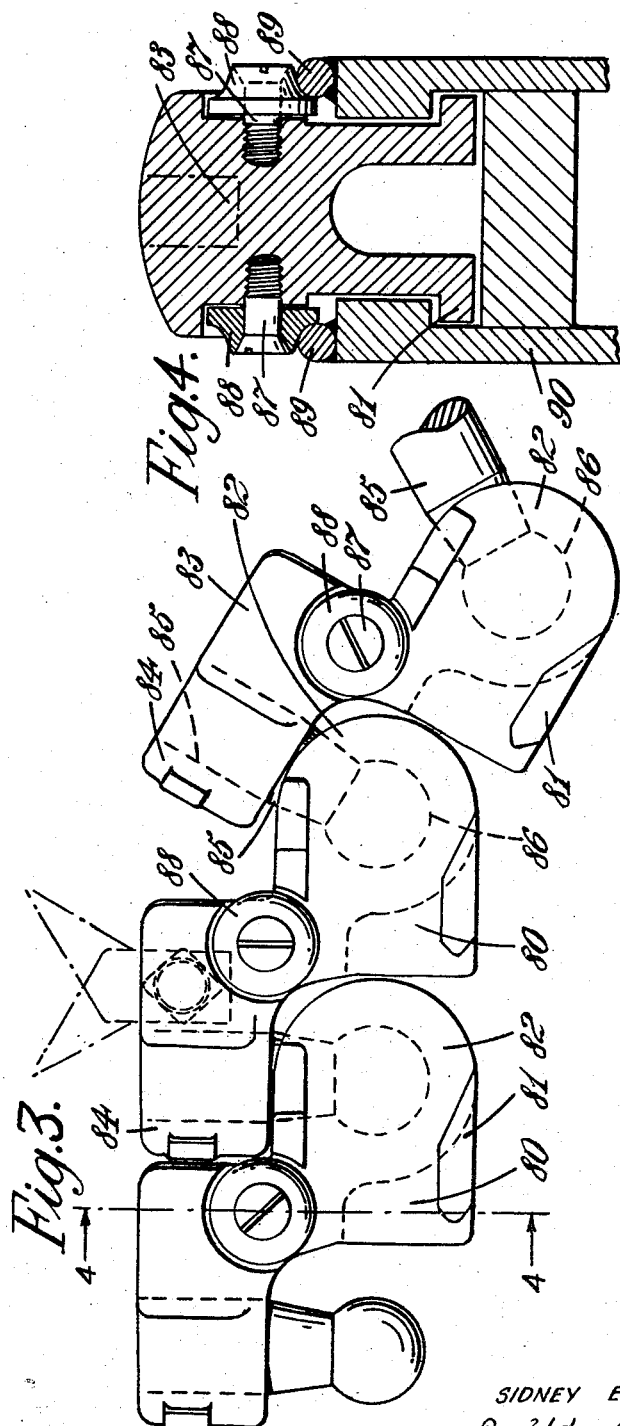

2,877,006

COAL-CUTTER CHAINS

Sidney Ernest Proctor, Saunderton, High Wycombe, England, assignor to Austin Hoy and Company Limited, Saunderton, High Wycombe, England, a British company Application June 22, 1956, Serial No. 593,205

Claims priority, application Great Britain June 22, 1955

3 Claims. (Cl. 262—28)

The present invention comprises improvements in or relating to coal-cutter chains.

In conventional coal-cutters, where the cutter chain runs on a jib, a considerable amount of power is wasted in overcoming the operational friction between the cutter chain and the jib. It is an object of the present invention to provide an improved construction of chain which runs on the jib with considerably less friction, thus saving power.

According to the present invention the jib is provided with a roller-track or tracks and rollers are provided on the chain to run on the tracks and ensure the free running of the cutter chain around curves in the jib thus reducing the operational friction between them.

In a preferred construction the jib is provided with two parallel rails one on each side of the chain, outside the normal groove in which the chain runs, and the chain is provided with transverse roller-shafts carrying rollers at each end so that the rollers overhang the sides of the chain and run on the rails of the jib.

The rollers may be mounted on roller shafts running in bearings on the links of the chain. In one construction the links of the chain comprise bosses to receive the roller shafts in such position on the links that the rollers run on tracks formed on the outer surface of the jib.

The rollers may be flanged if desired so as to tend to centre the chain relatively to the jib and they may run on rails on the jib of curved section to fit the roller flanges.

In one construction a ball joint chain is provided with flanged rollers having mountings which permit the rollers on one side of the chain to rotate independently of the rollers on the other side, so as to facilitate movement of the chain around lateral curves of the jib.

The following is a description by way of example of certain constructions in accordance with the present invention.

In the accompanying drawings:

Figure 1 is a side elevation of a preferred form of chain;

Figure 2 is a section upon the line 2—2 of Figure 1;

Figure 3 is a side elevation of a ball joint chain in accordance with the invention; and Figure 4 is a section upon the line 4—4 of Figure 3.

The links 60 of the chain shown in Figures 1 and 2 comprise eyes 61 at one end of each link which enter between ears 62 on the end of the next adjacent link. The ears and the eyes are joined together by hinge-pins 63. The hinge-pins 63 are retained in place by retaining wires 64 which are bent over at the ends and fit into recesses 65 formed in the ears 62. The ends of the hinge-pins have corresponding recesses for the wires 65 and thus the sides of the chain are flush and are able to run in the groove 66 in the edge of the jib 67 (Figure 6). The soles of the links 60 have flanges 68 which run in the bottom of the grooves of the jib, the outer part of the groove 66 being made of thicker material and overlying the flanges 68.

The edges of the jib 67 have rounded rails 70 welded upon them and on these rails run flanged rollers 71 carried by the links 60. The rollers 71 at one end are made solid with an axle 72 which runs in a bush 73 passing through an eye 74 in the links 60. The eye 74 is formed as a lateral bulge on one side of the pick-box 75 of each link. At the other end of the axle 72 the second roller which it carries is screwed in place as indicated at 76, Figure 2.

The effect of the flanged rollers 71 on the axles 72, running on the rounded rails 70, is to centre the chain effectively relative to the jib 67 and to keep the sides of the chain from rubbing on the sides of the groove 66, at all events to such an extent as to cause serious wear. Moreover, lateral forces exerted by the picks on the pick-boxes are transmitted by the flanged rollers 71 directly to the jib 67 with the minimum of friction and wear of the parts.

Figures 3 and 4 show a construction which in its essentials is similar to Figures 1 and 2 but applied to a ball joint chain. The chain consists of links 80 which have flanges 81 at their sole portions and sockets 82 at one end of each link. At the other end of each link there is an upstanding pick-box 83 which is extended to form an over-hanging portion 84 which receives the stem 85 of a ball-member 86, fitting in the socket of the next link.

Screws 87 enter the sides of the pick-boxes 83 and support flanged rollers 88 similar to the rollers 71 of Figures 5 and 6. There is a difference however in that the flanged rollers 88 of Figure 3 can each rotate independently of one another on the mounting screws 87, whereas the flanged rollers 71 of Figures 5 and 6 being mounted on the spindle 72 rigidly, must rotate at the same speed as each other.

This differential rotation to the flanged rollers 88 of Figures 3 and 4 is to allow for the fact that the chain shown, being a ball joint chain, can bend sideways as well as up or down and if it is going around a lateral curve on the jib 90 the rollers on one side of the chain need to rotate faster than the rollers on the other side. As before, there are rounded guides 89 shown in Figure 4 on the jib 90 which correspond to the rounded guides 70 on the jib 67 of Figures 1 and 2.

I claim:

1. A coal cutter comprising in combination a jib formed with a groove, a ball and socket jointed pick carrying chain guided for movement in said groove, two parallel rounded rails on the jib, one on each side of the chain outside the groove in which the chain runs, transverse roller mountings on the chain, flanged rollers on the outer ends of the mountings, so as to overhang the side of the chain, to run on said rails and center the chain relatively thereto.

2. A coal cutter chain as claimed in claim 1 wherein the flanged rollers on one side of the chain are able to rotate independently of those on the other side, to facilitate movement of the chain around lateral curves of the jib.

3. A coal cutter comprising in combination a jib formed with a groove, a tool carrying chain guided for movement in said groove, two parallel rounded rails on the jib, one on each side of the chain outside the groove in which the chain runs, transverse roller mountings on the chain, flanged rollers on the outer ends of the mountings, so as to overhang the side of the chain, to run on said rails and center the chain relatively thereto.

References Cited in the file of this patent

UNITED STATES PATENTS

| | | |
|---|---|---|
| 1,477,970 | McDaniel | Dec. 18, 1923 |
| 1,851,380 | Briggs | Mar. 29, 1932 |
| 2,774,395 | Tweedie | Dec. 18, 1956 |
| 2,810,568 | Fritzsche | Oct. 22, 1957 |